Figure 5:
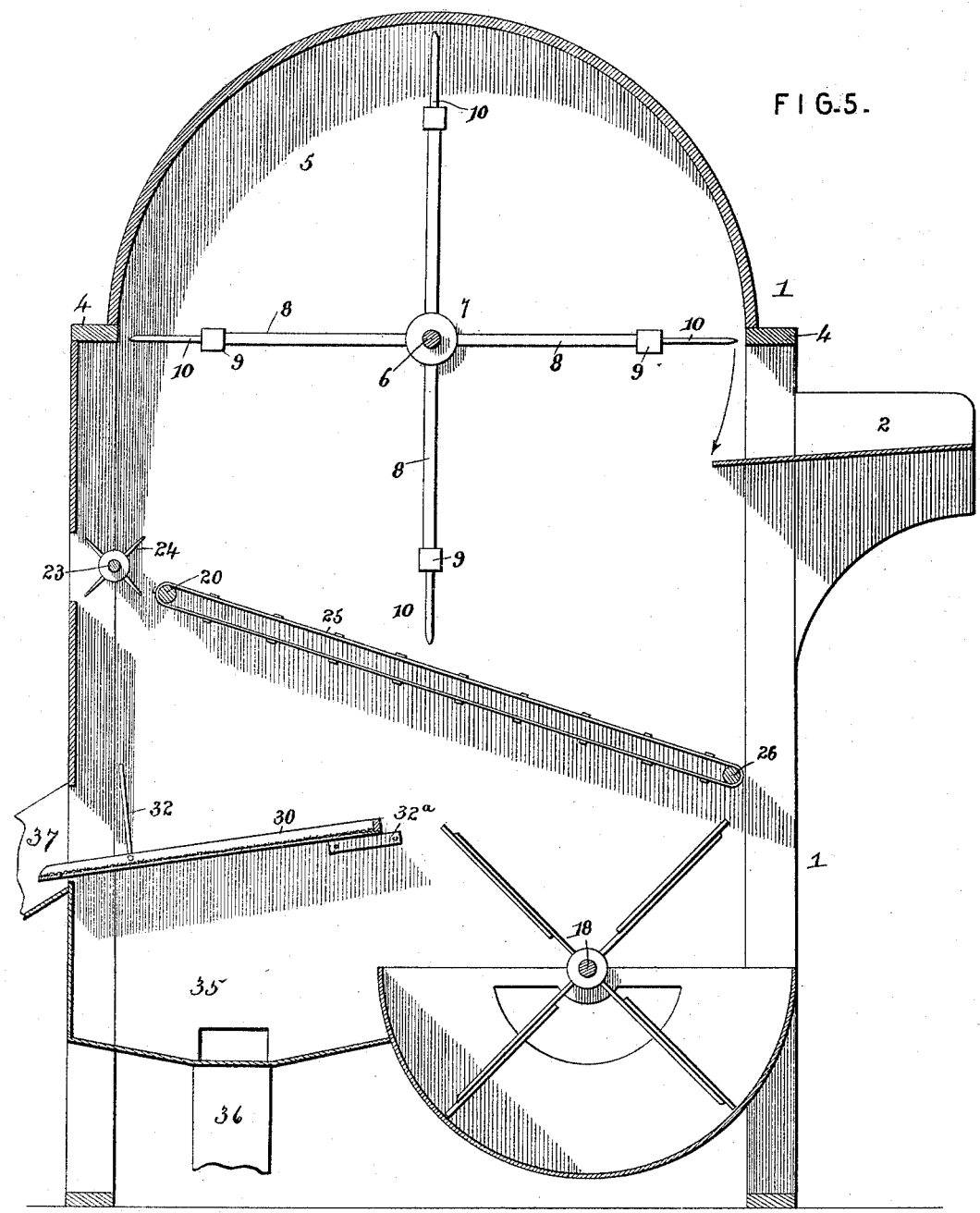

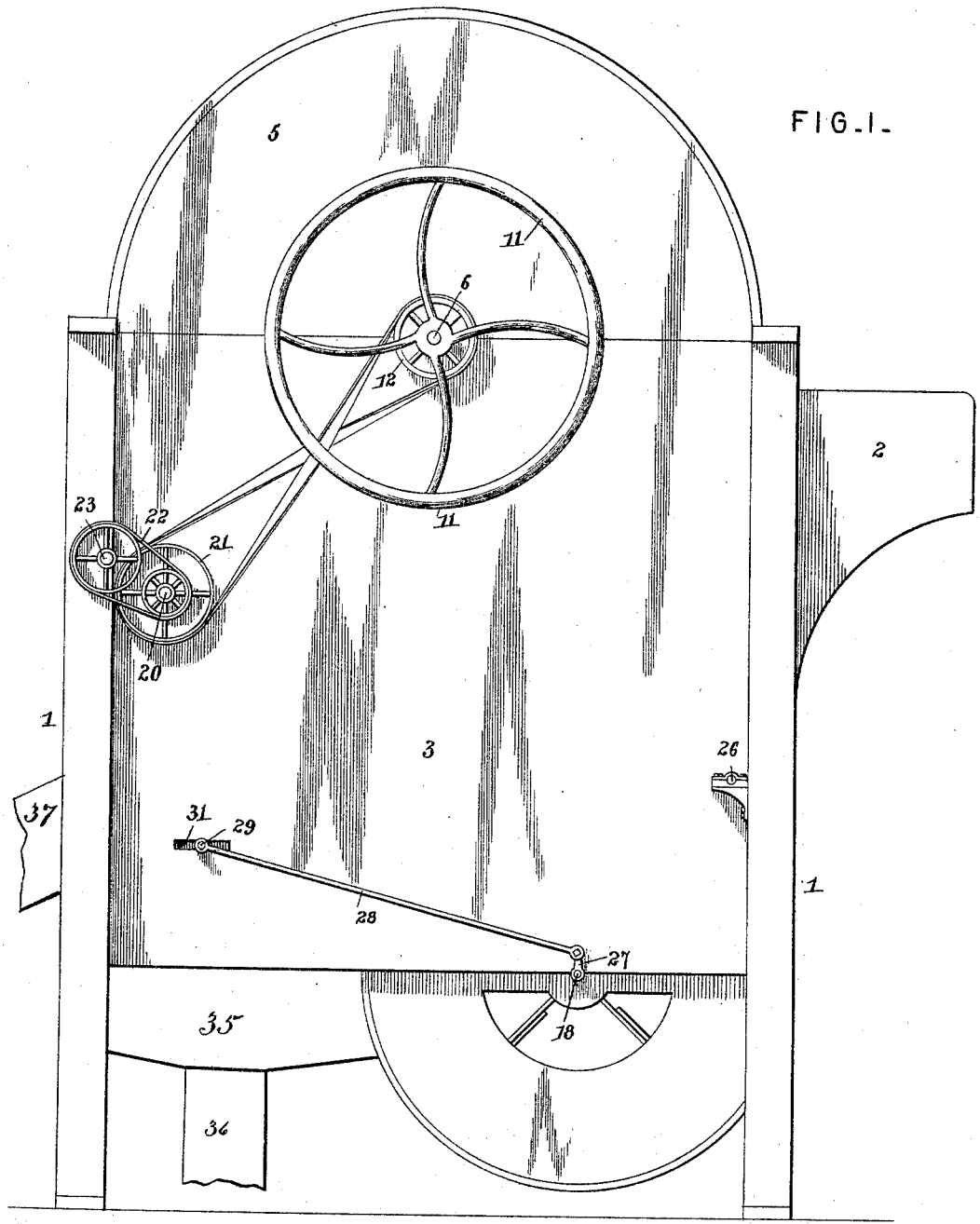

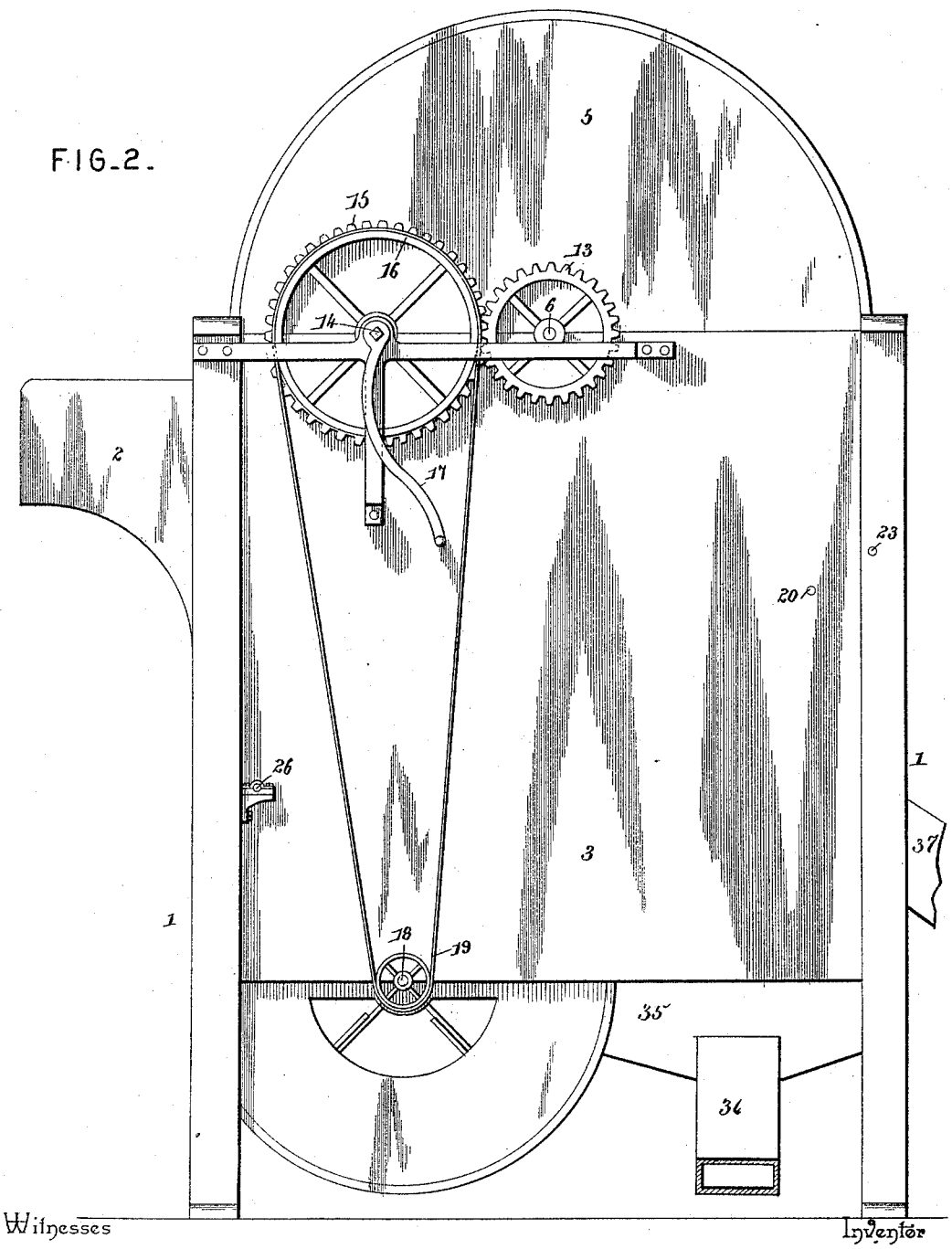

(No Model.) 4 Sheets—Sheet 3.
R. T. STEEDLEY.
THRASHER AND SEPARATOR.
No. 491,689. Patented Feb. 14, 1893.
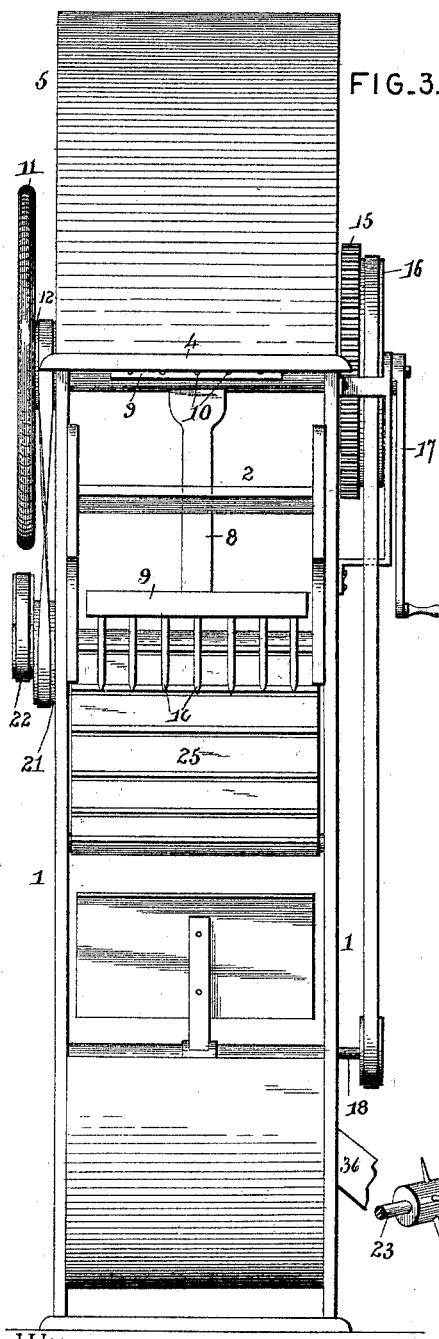
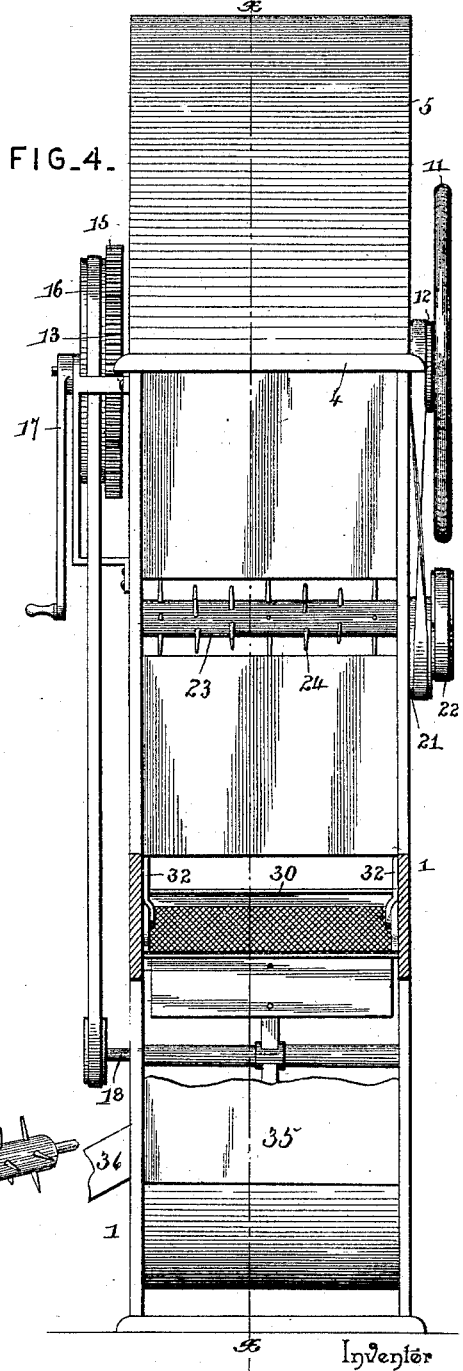

(No Model.)

R. T. STEEDLEY.
THRASHER AND SEPARATOR.

No. 491,689. Patented Feb. 14, 1893.

Witnesses
Jas. K. McCathran

Inventor
R. T. Steedley
By his Attorneys,
C. A. Snow & Co.

UNITED STATES PATENT OFFICE.

ROBERT T. STEEDLEY, OF HILLSBOROUGH, ASSIGNOR OF ONE-FOURTH TO GEORGE A. McILHENNY, OF FOREST, MISSISSIPPI.

THRASHER AND SEPARATOR.

SPECIFICATION forming part of Letters Patent No. 491,689, dated February 14, 1893.

Application filed July 22, 1892. Serial No. 440,913. (No model.)

*To all whom it may concern:*

Be it known that I, ROBERT T. STEEDLEY, a citizen of the United States, residing at Hillsborough, in the county of Scott and State of Mississippi, have invented a new and useful Thrasher and Separator, of which the following is a specification.

My invention relates to improvements in thrashing and separating machines for wheat, oats, and other grains; the object of my improvement being to provide a simple, compact, and effective device which may be operated by hand, or by horse, or other power.

My invention is fully described in connection with the accompanying drawings, and the novel features thereof are particularly pointed out in the appended claims.

In the drawings: Figure 1 is a side view of a thrasher and separator embodying my invention. Fig. 2 is a similar view of the opposite side. Fig. 3 is a front view. Fig. 4 is a rear view. Fig. 5 is a longitudinal central sectional view, upon line $x$—$x$ of Fig. 4. Fig. 6 is a view of the chaff comb detached.

The frame 1 is provided at its front end with the feed chute 2, the sides 3 of the frame being connected at the top by the transverse pieces 4, and a hood 5 being superimposed to cover the thrashing mechanism. In suitable bearings, $5^a$, at the upper edges of the sides, is mounted a transverse main shaft 6, which carries the thrashing-arms 7, said arms comprising the radial members 8, the cross-bars 9, and the fingers 10. One end of this shaft carries a balancing-wheel 11, provided on its inner surface with a belt-pulley 12, the opposite end of the shaft being provided with a pinion 13. Upon a stub-shaft 14, mounted upon the frame near said main shaft, is a gear-wheel 15, which meshes with the pinion 13, and is provided, upon its outer side, with a belt-pulley 16. The stub-shaft projects beyond the gear-wheel and pulley and is adapted for the reception of the operating crank 17, as shown. A belt-pulley may, if desired, be substituted for this crank.

18 represents a transverse fan-shaft, mounted below the inner end of the chute in bearings upon the sides of the frame, said fan-shaft being provided with a belt-pulley which is connected by a belt 19 to the belt-pulley upon the stub-shaft.

20 represents a transverse shaft, mounted near the opposite end of the frame, and carrying a belt-pulley 21, connected by a crossed belt with the belt-pulley upon the main shaft, and also connected by a belt 22 to a transverse shaft 23, which carries the chaff comb 24. The spirally-arranged radial teeth of this chaff comb operate at their free ends close to the shaft 20.

An endless apron 25 is carried at its upper end by the shaft 20, and at its lower end above the fan by the transverse shaft 26.

The inner end of the chute is located above the lower end of the endless apron, the extremities of the thrashing-arms being adapted to descend close to the discharging end of the chute.

The fan-shaft is provided at one end with a crank 27, which is connected by the connecting-rod 28 with a laterally-projecting stud or pin 29, which is attached to the horizontal screen 30, and projects through a horizontal slot 31 in the sides of the frame. This screen is suspended beneath the upper end of the endless apron upon the swinging hangers 32 at its outer end and guides $32^a$ at its inner end, whereby the rotation of the fan-shaft communicated through the connecting-rod, causes a horizontal vibration or reciprocation of the screen.

The operation of my improved thrasher and separator is briefly as follows: The stub-shaft being rotated by means of the crank or belt, or otherwise, causes the rotation of the thrashing-arms in the direction indicated by the arrow in Fig. 1, the fingers carried by said thrashing-arms coming in contact with the grain as it leaves the feeding chute, and dashing the same downwardly upon the endless apron, which is operated by a belt which connects its shaft with the main shaft. The fan, which is located in proximity to the lower end of the apron, removes the loose chaff and straw, and the grain is carried to the upper end of the apron, where it is attacked by the rotating chaff comb which separates the chaff from the grains and allows them to drop between the upper end of the apron and the comb to the screen which is suspended below. The operation of the screen is similar to that in other devices of this nature.

From the above description, it will be seen that my thrasher and separator comprises a minimum number of parts, arranged compactly, and capable of being operated with but small expenditure of power, and the grain, as it passes through the machine, is presented to the cleaners in such a manner as to enable the separation of the chaff therefrom to be thoroughly accomplished. The grain, after leaving the reciprocating screen falls into a receptacle 35 and is carried away by a conveyer 36, and the chaff is discharged from the screen into the spout 37.

Having thus described my invention, what I claim and desire to secure by Letters Patent, is:

1. In a machine of the class described, the combination with a casing having a side delivery, a feed chute, and a rotary thrasher having arms whose terminals traverse the mouth of the chute, of an imperforate inclined apron, arranged beneath the thrasher with its lower end under the feed chute, a rotary chaff-comb arranged between the upper end of the apron and the discharge opening, a screen located beneath the chaff-comb and the upper end of the apron, a fan, and means for operating the same and the thrasher, comb and screen, substantially as specified.

2. In a machine of the class described, the combination with the casing, having a lateral discharge opening of a shaft 6 mounted in bearings at its top, and provided with radial thrashing-arms, a removable domed cover 5 fitted upon the frame or cover, a feed-chute 2, arranged with its delivery end in proximity to the terminals of the thrashing-arms, an imperforate inclined endless apron arranged directly beneath the thrashing arms and having its lower end beneath the delivery end of the feed-chute, a rotary chaff-comb arranged between the upper end of the apron, and the discharge opening a reciprocatory screen 30 provided with hangers 32 and guides 32ª and arranged beneath the chaff comb and the upper end of apron, a fan 18, directing the blast through said discharge opening, means to operate the main-shaft and means whereby movement is communicated from the main-shaft to the apron, chaff-comb screen and fan, substantially as specified.

In testimony that I claim the foregoing as my own I have hereto affixed my signature in the presence of two witnesses.

ROBT. T. STEEDLEY.

Witnesses:
H. H. WATTS,
C. M. HOLIFIELD.